(12) United States Patent
Prescott (10) Patent No.: US 9,744,910 B2
(45) Date of Patent: Aug. 29, 2017

(54) FOLDABLE LOAD CARRIER WITH A LATCHING BRACE

(71) Applicant: Thule Sweden AB, Hillerstorp (SE)

(72) Inventor: Keith Prescott, Cambridge, VT (US)

(73) Assignee: Thule Sweden AB, Hillerstorp (SE)

( * ) Notice: Subject to any disclaimer, the term of this patent is extended or adjusted under 35 U.S.C. 154(b) by 114 days.

(21) Appl. No.: 14/754,387

(22) Filed: Jun. 29, 2015

(65) Prior Publication Data

US 2016/0001710 A1  Jan. 7, 2016

Related U.S. Application Data

(60) Provisional application No. 62/019,736, filed on Jul. 1, 2014.

(51) Int. Cl.
*B60R 9/10* (2006.01)
*B60R 9/06* (2006.01)
*B60R 11/00* (2006.01)

(52) U.S. Cl.
CPC ............ *B60R 9/06* (2013.01); *B60R 9/10* (2013.01); *B60R 2011/0082* (2013.01)

(58) Field of Classification Search
CPC ............ B60R 9/10; B60R 2011/0082; Y10T 16/54052; Y10T 16/54044
USPC ............ 224/924, 572, 309, 493, 495, 497, 224/504–508, 528–530; 16/334, 344, 346
See application file for complete search history.

(56) References Cited

U.S. PATENT DOCUMENTS

| | | | | |
|---|---|---|---|---|
| 485,589 | A * | 11/1892 | Ravanel | A47B 57/045 16/346 |
| 1,808,042 | A * | 6/1931 | Kennedy | B60R 9/06 224/42.21 |
| 1,853,608 | A * | 4/1932 | Gundry | B60R 9/06 224/499 |
| 1,912,958 | A * | 6/1933 | Widener | B60R 9/06 224/497 |
| 2,489,771 | A * | 11/1949 | Gibson | B60R 9/06 224/515 |
| 2,499,103 | A * | 2/1950 | Love | A01K 1/0272 119/28.5 |
| 3,282,368 | A * | 11/1966 | Pittera | B60R 9/06 180/53.7 |
| 3,879,146 | A * | 4/1975 | Mayer | A47C 1/026 16/325 |
| 4,125,214 | A * | 11/1978 | Penn | B60R 9/06 224/508 |
| 4,403,716 | A * | 9/1983 | Carlson | B60R 9/06 224/485 |

(Continued)

*Primary Examiner* — Justin Larson
(74) *Attorney, Agent, or Firm* — Sterne, Kessler, Goldstein & Fox P.L.L.C.

(57) ABSTRACT

A cargo load carrier configured to be mounted at the rear of a carrying vehicle and having a support frame mountable to the vehicle. A load carrying member is coupled to the support frame and is deployable from an undeployed configuration to a deployed configuration. A collapsible brace is coupled between the support frame and the load carrying member and has an articulated joint between a pair of pivot arms. A latch is releasably coupled between the pair of pivot arms and the latch has a plurality of latched configurations that releasably lock the load carrier in at least the travelling configuration and the load supporting configuration.

25 Claims, 7 Drawing Sheets

(56) References Cited

U.S. PATENT DOCUMENTS

| | | | | |
|---|---|---|---|---|
| 4,543,006 A * | 9/1985 | Wang | E06C 1/32 | 16/332 |
| 4,770,559 A * | 9/1988 | Yoo | E06C 1/32 | 182/163 |
| 4,890,950 A * | 1/1990 | Yoo | E06C 1/32 | 16/328 |
| 5,106,002 A * | 4/1992 | Smith | B60R 9/065 | 224/506 |
| 5,456,564 A * | 10/1995 | Bianchini | B60R 9/06 | 224/508 |
| 5,658,119 A * | 8/1997 | Allsop | B60R 9/10 | 224/536 |
| 5,662,256 A * | 9/1997 | Bryan | B60R 9/06 | 211/18 |
| 5,685,468 A * | 11/1997 | Hernandez | B60R 11/06 | 108/44 |
| 5,685,469 A * | 11/1997 | Stapleton | B60R 9/10 | 224/505 |
| 5,775,560 A * | 7/1998 | Zahn | B60R 9/06 | 224/485 |
| 5,950,892 A * | 9/1999 | Tsai | B60R 9/06 | 224/497 |
| 6,000,593 A * | 12/1999 | Chimenti | B60R 9/06 | 224/504 |
| 6,089,430 A * | 7/2000 | Mehls | B60R 9/06 | 224/506 |
| 6,330,733 B1 * | 12/2001 | Rauschenberger | E06C 1/32 | 16/324 |
| 6,579,055 B1 * | 6/2003 | Williams | B60P 3/07 | 224/497 |
| 6,688,797 B2 * | 2/2004 | Park | E06C 1/32 | 403/84 |
| 7,047,597 B2 * | 5/2006 | Lee | E06C 1/32 | 16/233 |
| 7,140,072 B2 * | 11/2006 | Leng | E06C 1/32 | 16/326 |
| 7,261,229 B1 * | 8/2007 | Allen | B60R 9/06 | 224/495 |
| 7,264,145 B2 * | 9/2007 | Lloyd | B60R 9/06 | 224/504 |
| 7,314,247 B1 * | 1/2008 | Chen | A47D 1/02 | 16/321 |
| 7,806,307 B2 * | 10/2010 | Bergerhoff | B60R 9/048 | 224/282 |
| 8,235,267 B2 * | 8/2012 | Sautter | B60R 9/06 | 224/497 |
| 8,469,245 B2 * | 6/2013 | Gregory | F41C 33/045 | 224/198 |
| 8,573,456 B2 * | 11/2013 | Farber | B60R 9/06 | 224/314 |
| 8,636,184 B2 * | 1/2014 | Allen | B60R 9/06 | 224/314 |
| 8,684,244 B2 * | 4/2014 | Pedrini | B60R 9/06 | 211/17 |
| 9,445,961 B2 * | 9/2016 | Okada | A47C 7/70 | |
| 9,533,625 B2 * | 1/2017 | Krishnan | B60R 9/10 | |
| 2002/0040917 A1 * | 4/2002 | Newbill | B60R 9/06 | 224/503 |
| 2003/0012595 A1 * | 1/2003 | Park | E06C 1/32 | 403/84 |
| 2004/0216277 A1 * | 11/2004 | Beaver | E06C 1/32 | 16/324 |
| 2006/0273125 A1 * | 12/2006 | Bogoslofski | B60R 9/10 | 224/509 |
| 2007/0251964 A1 * | 11/2007 | Gunn | B60R 9/10 | 224/504 |
| 2012/0091180 A1 * | 4/2012 | Allen | B60R 9/10 | 224/497 |
| 2013/0020366 A1 * | 1/2013 | Sautter | B60R 9/06 | 224/497 |
| 2013/0022440 A1 * | 1/2013 | Sautter | B60R 9/10 | 414/800 |
| 2016/0001710 A1 * | 1/2016 | Prescott | B60R 9/10 | 224/536 |
| 2016/0090017 A1 * | 3/2016 | Aich | B60P 1/48 | 700/218 |

* cited by examiner

FOLDABLE LOAD CARRIER WITH A LATCHING BRACE

TECHNICAL FIELD

The present disclosure relates to load carriers for transporting various articles, and in particular, to load carriers configured to transport bicycles.

BACKGROUND

Bicycle carriers, also referred to as bike carriers or bike racks, are well known among the general public as they are frequently seen mounted on traveling vehicles, and are particularly familiar to bicycle enthusiasts. Among such bike enthusiasts, it is often desired to ride in particular areas that can be remote and far from home; thus, transporting bicycles often becomes a necessity. Accordingly, trunk and hitch mounted bicycle carriers are often employed for this purpose, as they are generally easy to install and use.

Bicycle carriers include apparatus for their attachment to the carrying vehicle; among others, one type of bike carrier is mounted behind the vehicle, in abutment with a backside thereof, such as the trunk, hatch-back or tailgate. In this regard, such load carriers are typically referred to as trunk-mount bicycle carriers or racks.

Generally, such trunk-mount bicycle carriers will have portions that project rearwardly from the back of the vehicle and which are configured for receiving bicycles thereupon. The distance at which these bicycle engaging portions of the rack extend backwards can be significant. As a result, it is typically desirable to retract these backward extending, bicycle engaging portions of the rack into a travelling configuration when the rack is not in use, but while the rack is still mounted to the vehicle. Thus, arrangements for achieving such retracted, travelling configurations are needed.

BRIEF DESCRIPTION OF THE DRAWINGS

A bicycle rack according to the present disclosure shall be described with reference to the following figures, in which.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other feature that is modified by the word "substantially", such that the feature of the component need not be exact. The term "comprising," when utilized, means "including, but not necessarily limited to"; it specifically indicates open-ended inclusion or membership in the so-described combination, group, series and the like.

Relative spatial references such as "above," "below," "upper," "lower," "rearward," "forward," "over," "under," "horizontal" "vertical" and the like are to be taken and interpreted as shown in the drawings as if the load carrier is mounted to a carrying vehicle (though not shown) in an installed orientation, and the load carrier is configured to either the load supporting or travelling configurations as is described, and as would be understood by persons skilled in the art.

Figure 1:
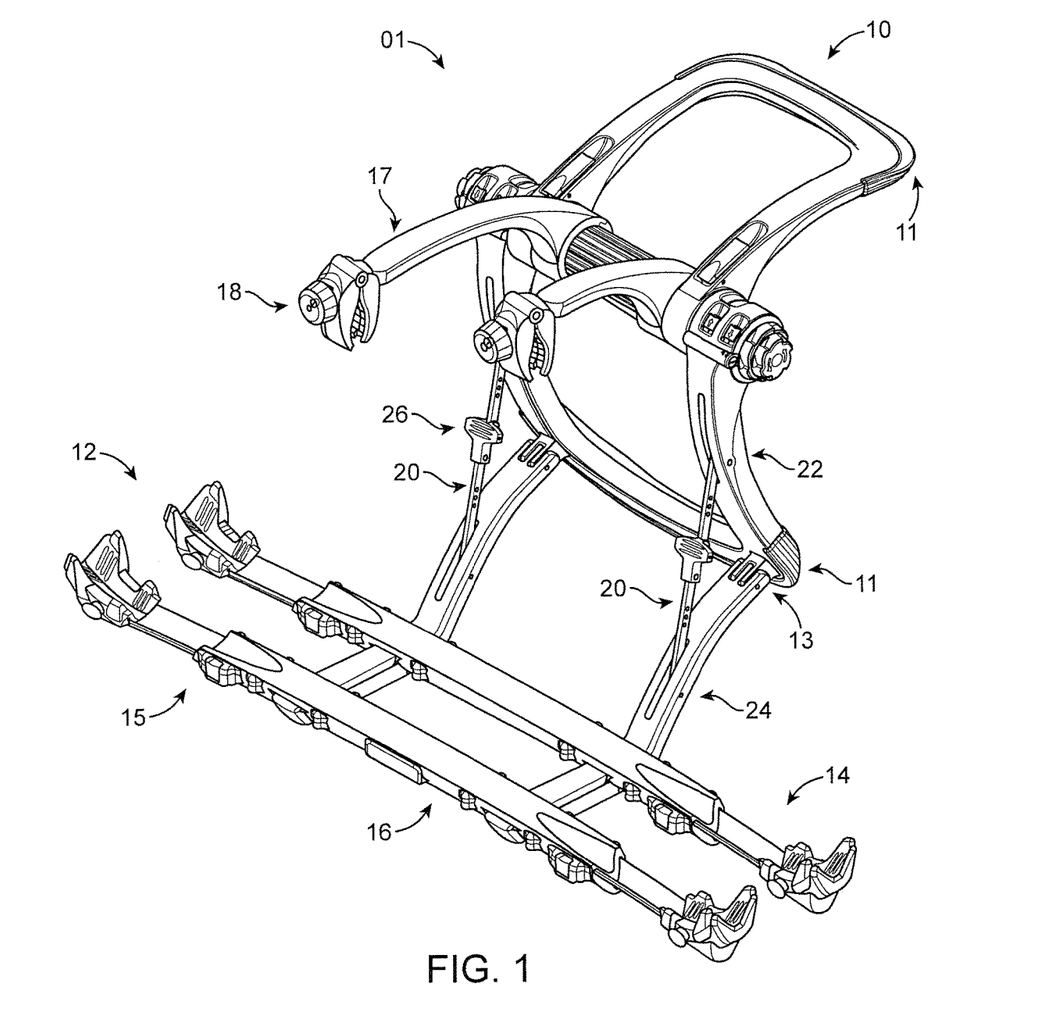
FIG. 1 is an isometric view of one embodiment of a vehicle mounted cargo load carrier in a load supporting configuration.

Referring to the figures, one example embodiment of a cargo load carrier 01 is shown in FIG. 1 which can be configured to mount on a backside of a vehicle such as the trunk, hatch back, or tailgate portion.

Figure 2:
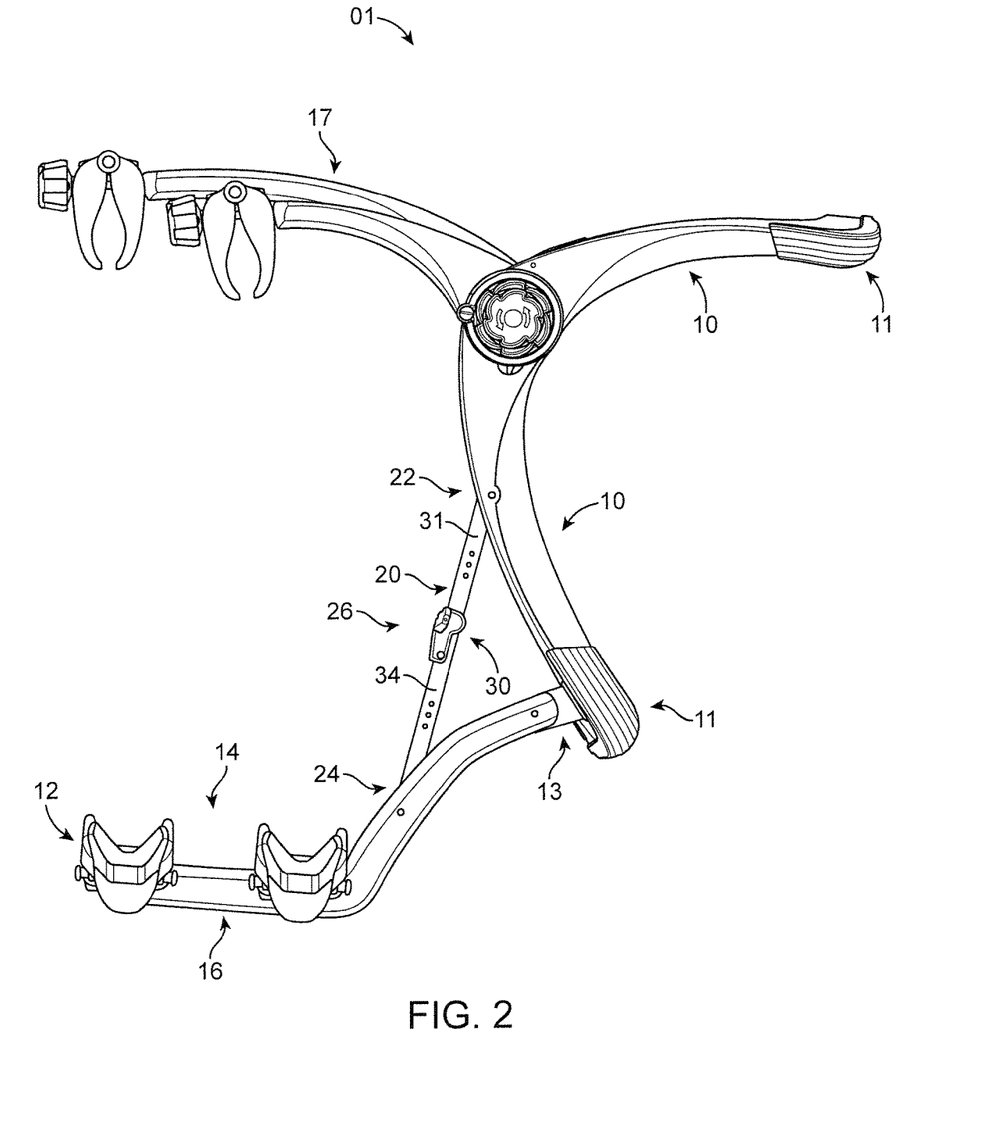
FIG. 2 is a side view of the embodiment of FIG. 1 showing the load carrying platform in an extended, deployed configuration of the load carrier.

As depicted, the example cargo load carrier 01 includes a support frame 10, a load carrying member in the form of a load carrying platform 12, and a collapsible brace 20. The support frame abuttingly engages the back side of a carrying vehicle (not shown) at the vehicle contact points 11 of the carrier 01. When properly mounted to the carrying vehicle, this abutting engagement establishes an installed orientation of the cargo load carrier 01. The load carrying platform 12 is coupled to the support frame 10 by pivot connection 13 and is downwardly deployable from an undeployed configuration (FIG. 3) to a deployed configuration (FIGS. 1 and 2). The undeployed configuration of the load carrying platform 12 corresponds to a travelling configuration of the load carrier 01 (FIG. 3), and the deployed configuration of the load carrying platform 12 corresponds to a load supporting configuration of the cargo load carrier 01 (FIGS. 1 and 2). It is also contemplated that the load carrying member could take the form of a load arm, for instance, configured to receive one our more bicycles thereupon, and which is upwardly deployable from a folded-down, undeployed configuration to a backwardly extending deployed configuration.

In at least one embodiment, the cargo load carrier 01 is configured to support a plurality of bicycles (not shown) when the load carrying platform 12 is in the deployed configuration and the load carrier 01 is in the load supporting configuration.

Figure 3:
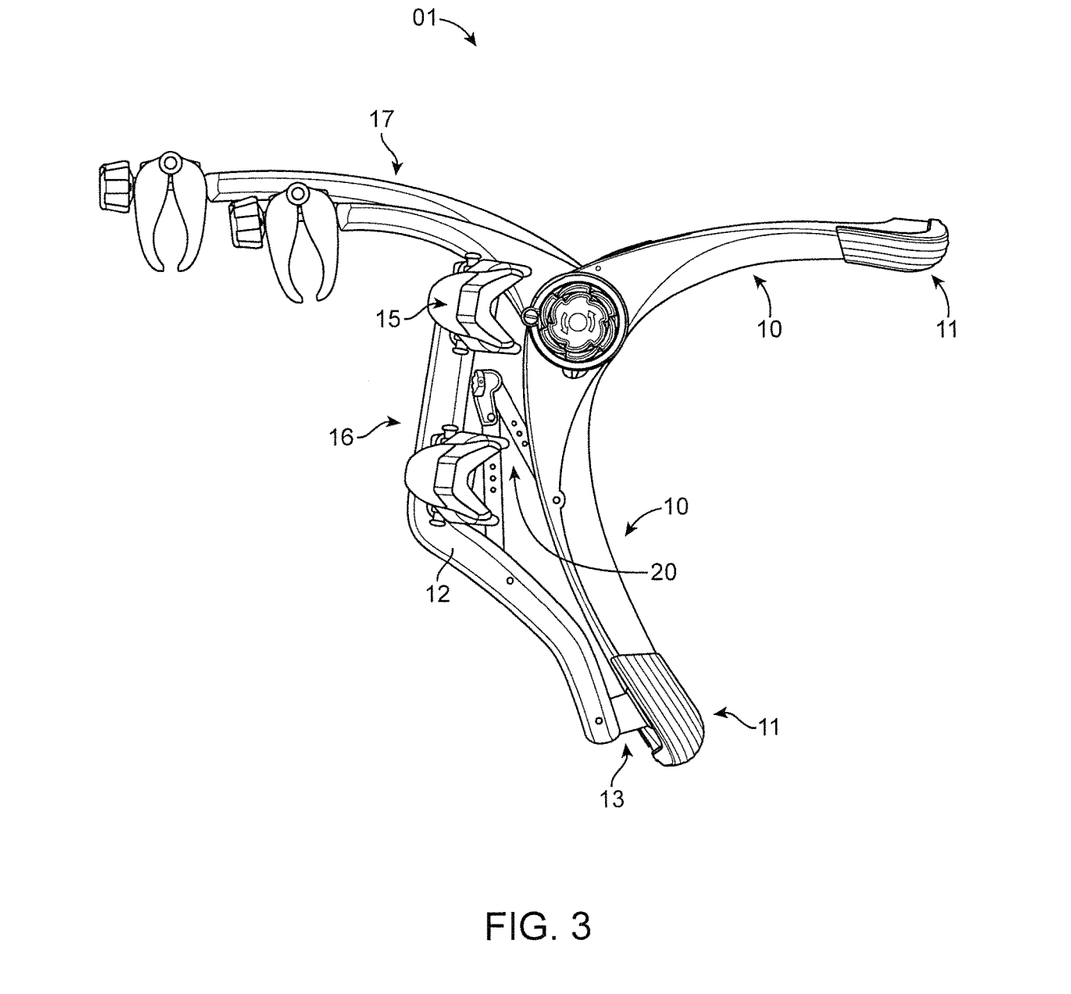
FIG. 3 is an isometric view of the embodiment of FIG. 1 showing the load carrying platform in a folded-up, undeployed configuration.

As depicted, the collapsible brace 20 has an upper end 22 and a lower end 24. The brace 20 is coupled to the support frame 10 proximate the upper end 22 of the brace, and the brace 20 is coupled to the load carrying platform 12 proximate the lower end 24 of the brace. The upper and lower ends 22, 24 are located at a first distance from one another in the load supporting configuration of the cargo load carrier 01 (FIG. 1). By comparison, the upper and lower ends 22, 24 of the brace 20 are located at a lesser, second distance from one another in the travelling configuration of the cargo load carrier 01 (FIG. 3).

The plurality of vehicle contact points 11 are positioned to simultaneously abuttingly engage the backside of a carrying vehicle. Among others, the backside can be a trunk of a car, a hatch back of a car or a tailgate of a pickup truck. In at least one embodiment, the support frame 10 abuttingly engages the carrying vehicle at four contact points 11.

FIG. 2 illustrates a side view of the cargo load carrier 01 of FIG. 1 in which the platform 12 is in its deployed configuration and the carrier 01 is in its load supporting configuration. FIG. 3 illustrates the cargo load carrier 01 in its travelling configuration with the platform 12 in its undeployed configuration. As shown in FIGS. 1 and 2, the load carrying platform 12 has an upper side 14 and a lower side 16. The upper side 14 of the load carrying platform 12 can include bicycle anchors 15 configured to receive wheels of a bicycle therein and maintain such a bicycle in an upright orientation for transport on the carrier 01. For stability and maintaining the upright orientation of the bicycle, stabilizing arms 17 are provided that secure a bicycle's top frame member in a clamp 18 thereof.

As shown in FIGS. 1 and 2, the load carrying platform 12 is configured to be positioned in a substantially horizontal orientation when the load carrier 01 is in the installed orientation upon the carrying vehicle and the platform is in the deployed configuration. The load carrying platform 12 can further be configured to be positioned in a substantially vertical orientation when the load carrier 01 is in the installed orientation and the platform is in the undeployed configuration (FIG. 3).

Figure 4:
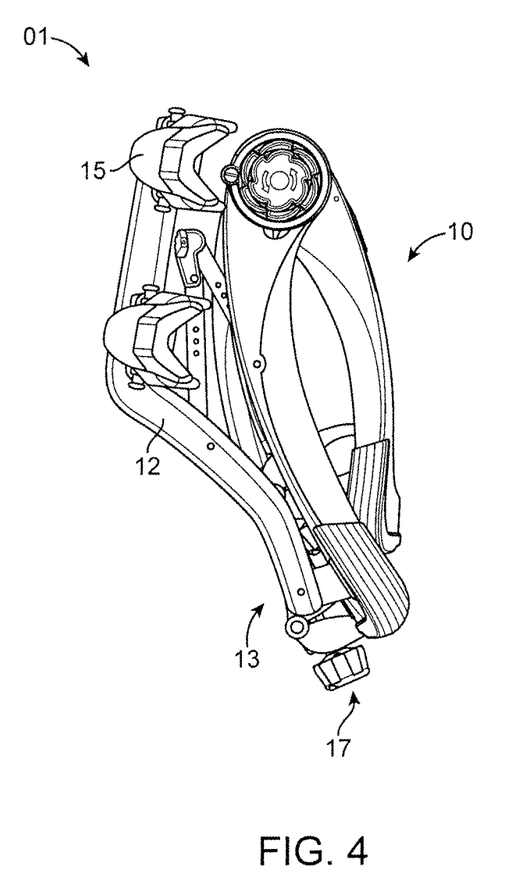
FIG. 4 is an isometric view of the vehicle mounted cargo load carrier in a compact, storable configuration.

FIG. 4 illustrates the load carrier 01 in a fully collapsed, most compact configuration for storage with the support frame 10 folded into a nested configuration with the platform 12.

Figure 5:
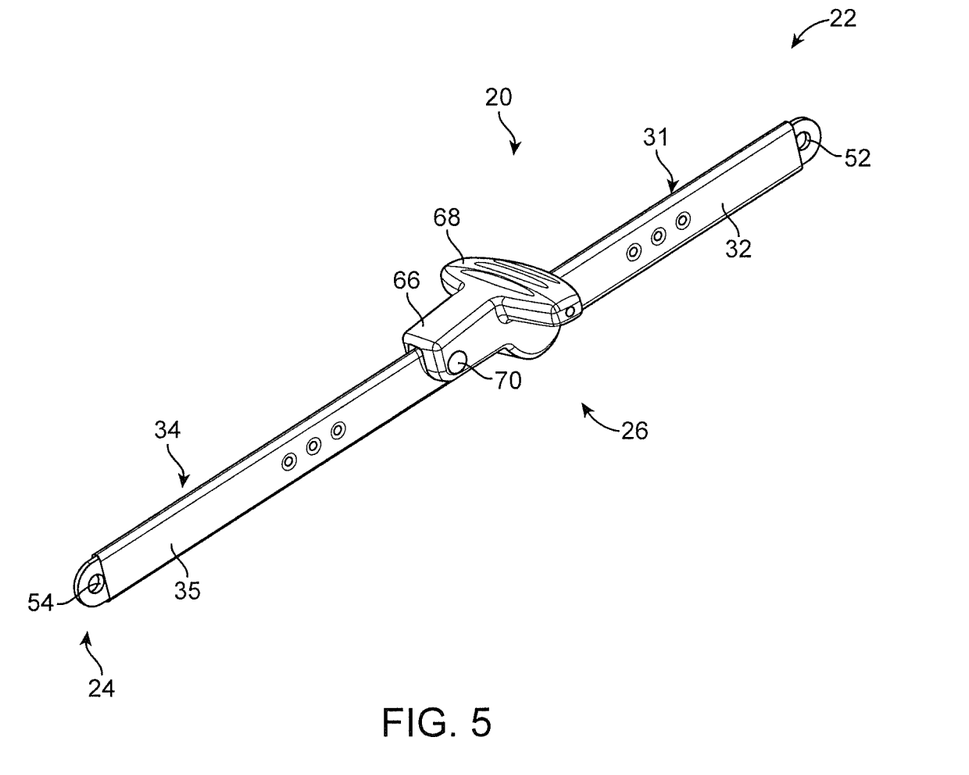
FIG. 5 is an isometric view of one embodiment of a collapsible brace.
Figure 6A:
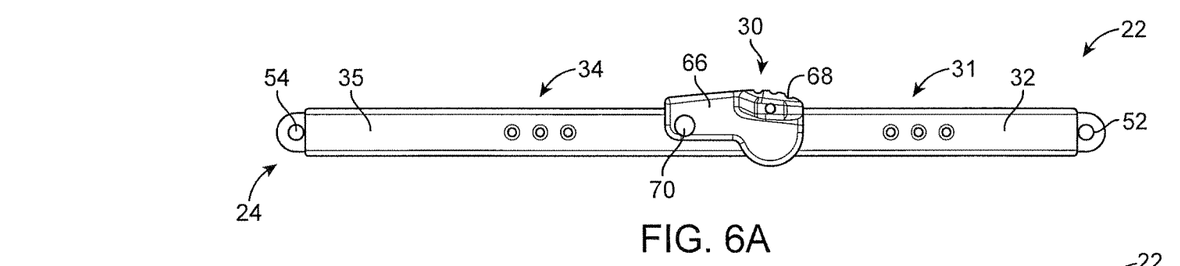
FIG. 6A is a side view of the collapsible brace in a latched configuration corresponding to the deployed configuration of the load carrying platform.
Figure 6B:
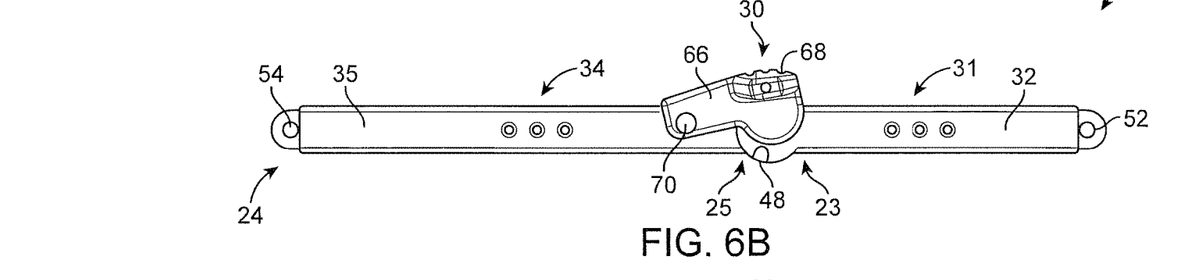
FIG. 6B is a side view of the collapsible brace of FIG. 6A in an unlatched configuration.
Figure 6C:
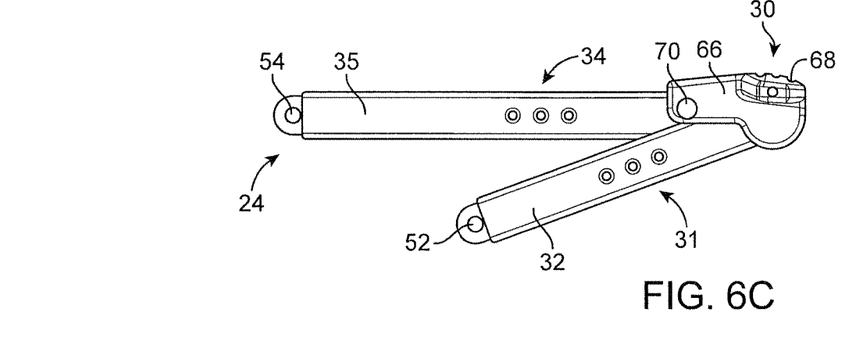
FIG. 6C is a side view of the collapsible brace of FIGS. 6A and 6B in a latched configuration corresponding to the undeployed configuration of the load carrying platform.
Figure 7A:
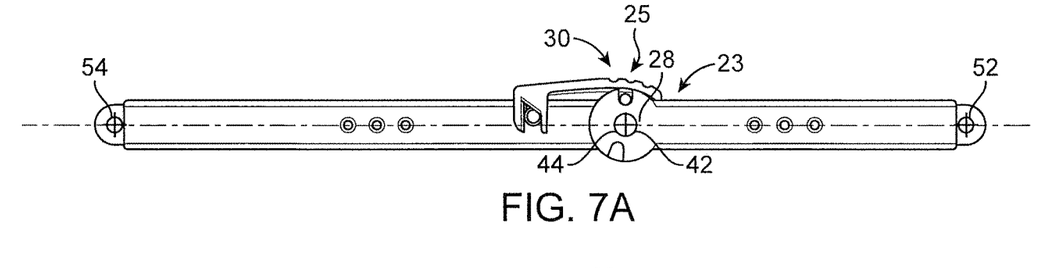
FIG. 7A is a partial cut-away view of the collapsible brace of FIG. 6A showing details of the latch.
Figure 7B:
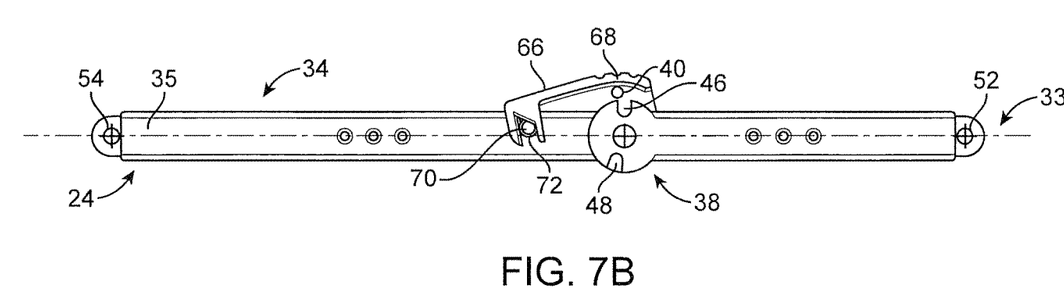
FIG. 7B is a partial cut-away view of the collapsible brace of FIG. 6B showing details of the latch.
Figure 7C:
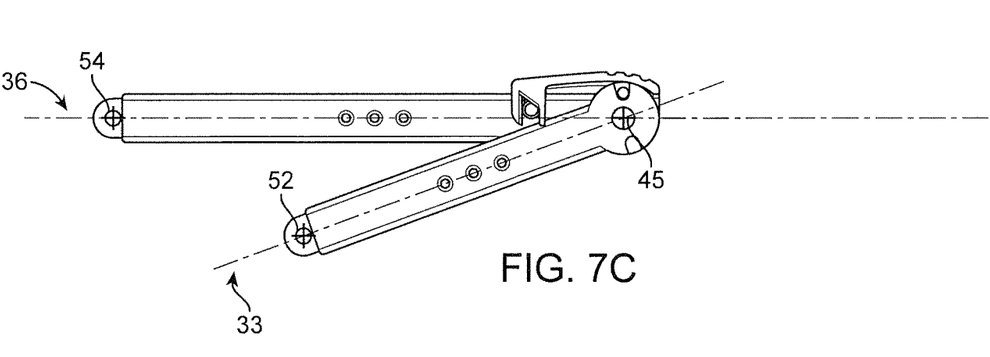
FIG. 7C is a partial cut-away view of the collapsible brace of FIG. 6C showing details of the latch.

FIGS. 5-7 variously illustrate the collapsible brace 20. Referring to FIG. 5, the collapsible brace 20 includes an articulated joint 26 located along the length of the brace 20. As shown, the articulated joint 26 is located at approximately mid-length of the brace 20 and functions like an elbow. The collapsible brace 20 includes a pair of pivot arms comprising an upper arm 31 and a lower arm 34 coupled via a pivot connection 28 at the articulated joint 26. A latch 30 is provided at the articulated joint 26 and which is configured to releasably fix the upper arm 31 and lower arm 34 relative to one another.

The latch 30 includes multiple settings capable of releasably fixing the upper arm 31 and lower arm 34 in a plurality of different orientations relative to one another. The plurality of different orientations can include the one depicted in FIGS. 1 and 2 in which the brace 20 is extended and substantially straight, as well as the one depicted in FIG. 3 in which the brace 20 is rotated at the pivot connection 28, resulting in an acute angle being formed between the upper arm 31 and the lower arm 34 of the brace 20.

The upper arm 31 and lower arm 34 each include an elongate body 32, 35, respectively (FIG. 5) and each elongate body 32, 35 comprises a lengthwise oriented longitudinal axis 33, 36, respectively (FIG. 7). The longitudinal axis 33 of the upper arm 31 can be orientated substantially parallel to the longitudinal axis 36 of the lower arm 34 in the load supporting configuration of the cargo load carrier 01. As depicted in FIGS. 7A and 7B, the longitudinal axes 33, 36 are oriented in substantial alignment when the platform 12 is in the deployed configuration and the carrier 01 is in the load supporting configuration. In comparison, as depicted in FIG. 7C, the longitudinal axes 33, 36 are oriented at an acute angle when the platform 12 is in the undeployed configuration and the carrier 01 is in the travelling configuration of FIG. 3.

The upper arm 31 includes a rotational aperture 42 in a joint end 23 thereof and the lower arm 34 includes a rotational aperture 44 in a joint end 25 of the lower arm 34. The two rotational apertures 42, 44 are coupled together for relative rotation, one to the other, at the pivot connection 28. The pair of pivot apertures 42, 44 each has an axis of rotation, and the two axes of rotation are aligned. A pivot pin 45 can be inserted through the pair of pivot apertures 42, 44 coupling the upper arm 31 and lower arm 34 together. The upper arm 31 and the lower arm 34 are configured to rotate or pivot about the pivot pin 45 when the cargo load carrier is transitioned between the load supporting and travelling configurations.

The upper arm 31 further includes a pivot aperture 52 in a frame end corresponding to the upper end 22 of upper arm 31, opposite the arm's joint end 23. The pivot aperture 52 is configured to pivotably connect the upper arm 31 and the support frame 10. The longitudinal axis 33 of the upper arm 31 extends between the centerpoints of the arm's rotational aperture 42 and pivot aperture 52.

The lower arm 34 further includes a pivot aperture 54 in a platform end corresponding to the lower end 24 of the lower arm 34, opposite the arm's joint end 25. The pivot aperture 54 is configured to pivotably connect the lower arm 34 and the load carrying platform 12. The longitudinal axis 36 of the lower arm 34 extends between the centerpoints of the arm's rotational aperture 44 and pivot aperture 54.

A hub 38 is radially built-up about one of the rotational apertures 42, 44. In the illustrations of FIGS. 6A-7C, hub 38 is included on the upper arm 31 and surrounds that arm's rotational aperture 42. As shown, the surrounding hub 38 is substantially circular and wheel-like. The encircling hub 38 includes a plurality of notches in its periphery configured to releasably receive an interference member 40 of the latch 30. The interference member 40 is configured to fix the upper arm 31 and lower arm 34 into particular orientation(s). In at least one embodiment, the interference member 40 is a pin or bar configured to lock the pivot connection 28 into a particular orientation. As illustrated, the surrounding hub 38 includes two notches; a first notch 46 corresponding to the load supporting configuration of the cargo load carrier 01 and a second notch 48 corresponding to the travelling configuration of the cargo load carrier 01. Preferably, the interference member 40 is configured to be biased toward the hub 38 and into receipt within the plurality of notches, one at a time.

In an alternative embodiment, the interference member 40 of the latch 30 can take any form that engages a receiver in the arm 31, 34 opposite the arm 31, 34 to which the interference member 40 is coupled. For example, the interference member 40 can be an insert pin that can be selectively inserted into any one of a plurality of receiving apertures for setting different latched configurations of the load carrier.

The latch 30 further includes a lever arm 66 pivotably mounted to the other of the two arms that does not comprise the encircling hub 38 by pivot pin 70. The lever arm 66 is spring-biased toward the hub 38 by coil spring 72 positioned around the pivot pin 70 and engaging the lever arm 66. In operation, the coil spring 72 biases the lever arm 66 toward the hub 38 with the interference member 40 abuttingly engaged upon the periphery of the hub 38. In this way exact insertion of the interference member 40 into a desired notch 46, 48 is not necessary; the interference member 40 will ride along the periphery of the hub 38 and drop into the next-encounter notch, as desired.

The latch 30 can include a manually graspable handle 68 for moving the lever arm 66 away from the hub 38. In at least one embodiment, the manually graspable handle 68 can be ergonomically shaped, and its exterior surface textured, for example with ridges and groove, as illustrated, to facilitate an operator's grip.

The embodiments shown and described above are only examples. For simplicity, some details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A cargo load carrier configured to be mounted at the rear of a carrying vehicle and support a bicycle, the cargo load carrier comprising:
    a support frame releasably mountable to the carrying vehicle and that establishes an installed orientation of the load carrier when mounted upon the carrying vehicle;
    a load carrying member coupled to the support frame, the load carrying member configured to support a wheel of the bicycle and deployable from an undeployed configuration corresponding to a travelling configuration of the load carrier to a deployed configuration of the load carrying member corresponding to a load supporting configuration of the load carrier;
    a first stabilizing arm coupled to the support frame and configured to secure the bicycle on the load carrying member;
    a collapsible brace coupled between the support frame and the load carrying member and having an articulated joint between a pair of pivot arms; and
    a latch, releasably coupled between the pair of pivot arms, wherein the latch has a plurality of latched configurations that releasably lock the load carrier in at least the travelling configuration and the load supporting configuration.

2. The cargo load carrier recited in claim 1, wherein the load carrying member is a load carrying platform coupled to the support frame and which is downwardly deployable from the undeployed configuration corresponding to the travelling configuration of the load carrier to the deployed configuration of the load carrying platform corresponding to the load supporting configuration of the load carrier.

3. The cargo load carrier recited in claim 2, wherein the collapsible brace has an upper end and a lower end, wherein the brace is coupled to the support frame proximate the upper end of the brace and the brace is coupled to the load carrying platform proximate the lower end of the brace in the load supporting configuration of the load carrier, and wherein the upper and lower ends of the brace are located at a first distance from one another in the load supporting configuration of the load carrier and the upper and lower ends of the brace are located at a lesser, second distance from one another in the travelling configuration of the load carrier.

4. The cargo load carrier recited in claim 1, wherein the support frame further comprises a plurality of vehicle contact points positioned to simultaneously abuttingly engage at least one of a (i) trunk, (ii) hatch back and (iii) tailgate of the carrying vehicle in the installed orientation of the load carrier.

5. The cargo load carrier recited in claim 2, wherein an upper side of the load carrying platform comprises bicycle anchors for securing a bicycle upon the platform in an upright orientation, and wherein the load carrying platform is positioned in a substantially horizontal orientation when the load carrier is in the installed orientation upon the carrying vehicle and the platform is in the deployed configuration.

6. The cargo load carrier recited in claim 5, wherein the load carrying platform is positioned in a substantially vertical orientation when the load carrier is in the installed orientation upon the carrying vehicle and the platform is in the undeployed configuration.

7. The cargo load carrier recited in claim 1, wherein the collapsible brace is elongate and the articulated joint is located along a length of the elongate brace.

8. The cargo load carrier recited in claim 7, wherein the articulated joint comprises a pivot connection coupling together the pair of pivot arms that comprise an upper arm of the brace and a lower arm of the brace.

9. The cargo load carrier recited in claim 8, wherein each of the upper and lower arms comprises an elongate body having a lengthwise oriented longitudinal axis, and wherein the longitudinal axis of the upper arm is oriented substantially parallel to the longitudinal axis of the lower arm in the load supporting configuration of the load carrier.

10. The cargo load carrier recited in claim 9, wherein the longitudinal axis of the upper arm is oriented in substantial alignment with the longitudinal axis of the lower arm in the load supporting configuration of the load carrier.

11. The cargo load carrier recited in claim 10, wherein the longitudinal axis of the upper arm is oriented at an acute angle relative to the longitudinal axis of the lower arm in the travelling configuration of the load carrier.

12. The cargo load carrier recited in claim 8, wherein the pivot connection comprises a pair of rotational apertures, one rotational aperture in a joint end of the upper arm and the other rotational aperture in a joint end of the lower arm, wherein the pair of rotational apertures are coupled together for relative rotation, one to the other.

13. The cargo load carrier recited in claim 12, wherein each of the pair of rotational apertures has an axis of rotation and the two axes of rotation are aligned, one with the other and a pivot pin is inserted through the pair of rotational apertures thereby coupling the upper and lower arms together.

14. The cargo load carrier recited in claim 13, wherein the upper arm comprises a pivot aperture in a frame end thereof, opposite the arm's joint end and which is pivotably connected to the support frame, and wherein the longitudinal axis of the upper arm extends between centerpoints of the pivot aperture and the rotational aperture in the upper arm.

15. The cargo load carrier recited in claim 14, wherein the lower arm comprises a pivot aperture in a platform end thereof, opposite the arm's joint end and which is pivotably connected to the load carrying platform, and wherein the longitudinal axis of the lower arm extends between centerpoints of the pivot aperture and the rotational aperture in the lower arm.

16. The cargo load carrier recited in claim 15, wherein one of the pair of rotational apertures in the joint ends of the upper and lower arms has a surrounding hub comprising a plurality of notches into a periphery of the hub, wherein each notch is configured to releasably receive an interference member of the latch therein.

17. The cargo load carrier recited in claim 16, wherein the plurality of notches comprises two notches, one notch corresponding to the deployed configuration of the load carrying platform when the interference member of the latch is received therein and the other of the two notches corresponding to the undeployed configuration of the load carrying platform when the interference member of the latch is received therein.

18. The cargo load carrier recited in claim 17, wherein the interference member of the latch is biased toward the hub and into receipt within the notches.

19. The cargo load carrier recited in claim 18, wherein the latch comprises a lever arm pivotably mounted to the arm that does not comprise the surrounding hub.

20. The cargo load carrier recited in claim 19, wherein the lever arm is spring-biased toward the hub.

21. The cargo load carrier recited in claim 18, wherein a lever arm of the latch is pivotably mounted to the arm that does not comprise the surrounding hub by a pivot pin about which a coil spring is positioned and which spring-biases the lever arm toward the hub.

22. The cargo load carrier recited in claim 21, wherein the latch further comprises a manually graspable handle for moving the lever arm away from the hub.

23. The cargo load carrier recited in claim 1, wherein the first stabilizing arm further comprises a clamp disposed at an end of the arm, wherein the clamp is configured to engage a frame member of the bicycle.

24. A bicycle carrier configured to be mounted at the rear of a carrying vehicle and support a bicycle, the bicycle carrier comprising:
   a support frame releasably mountable to the carrying vehicle;
   a bicycle platform coupled to the support frame at a pivot connection, the bicycle platform comprising at least one bicycle anchor configured to receive a wheel of the bicycle, wherein the bicycle platform is configured to pivot from an undeployed configuration where the bicycle platform is positioned in a substantially vertical orientation to a deployed configuration where the bicycle platform is positioned in a substantially horizontal orientation;
   a first stabilizing arm coupled to the support frame and configured to engage a frame member of the bicycle to secure the bicycle on the bicycle platform;
   a collapsible brace coupled between the support frame and the bicycle platform, the collapsible brace comprising a first arm coupled to a second arm at an articulated joint; and
   a latch disposed at the articulated joint configured to releasably fix the first arm and the second arm relative to one another, wherein the latch has a plurality of latched configurations to releasably lock the bicycle platform in at least the undeployed configuration and the deployed configuration.

25. The bicycle carrier recited in claim 24, wherein the latch is pivotably coupled to the first arm and the latch further comprises an interference member configured to engage the second arm to fix the first arm and the second arm relative to one another.

* * * * *